V. BERKOFF.
LINE DOTTER.
APPLICATION FILED MAY 8, 1918.
1,293,313. Patented Feb. 4, 1919.
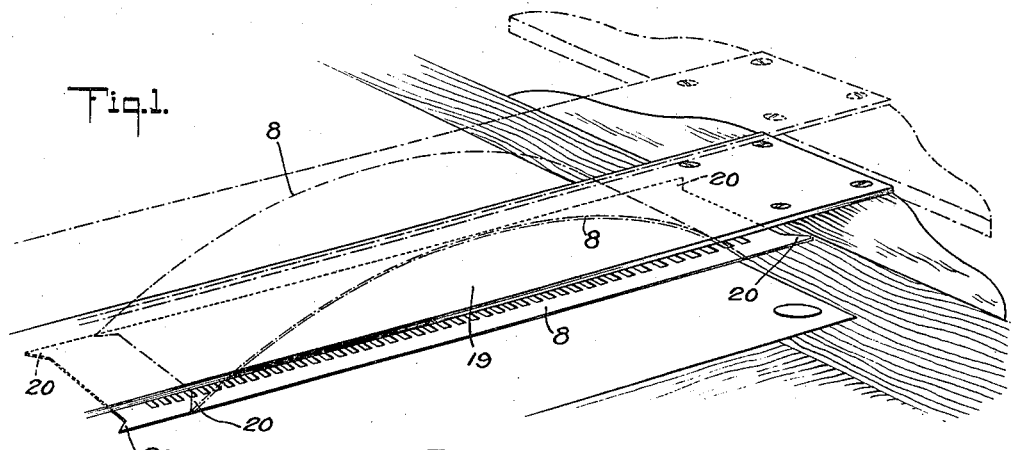
Fig. 1.
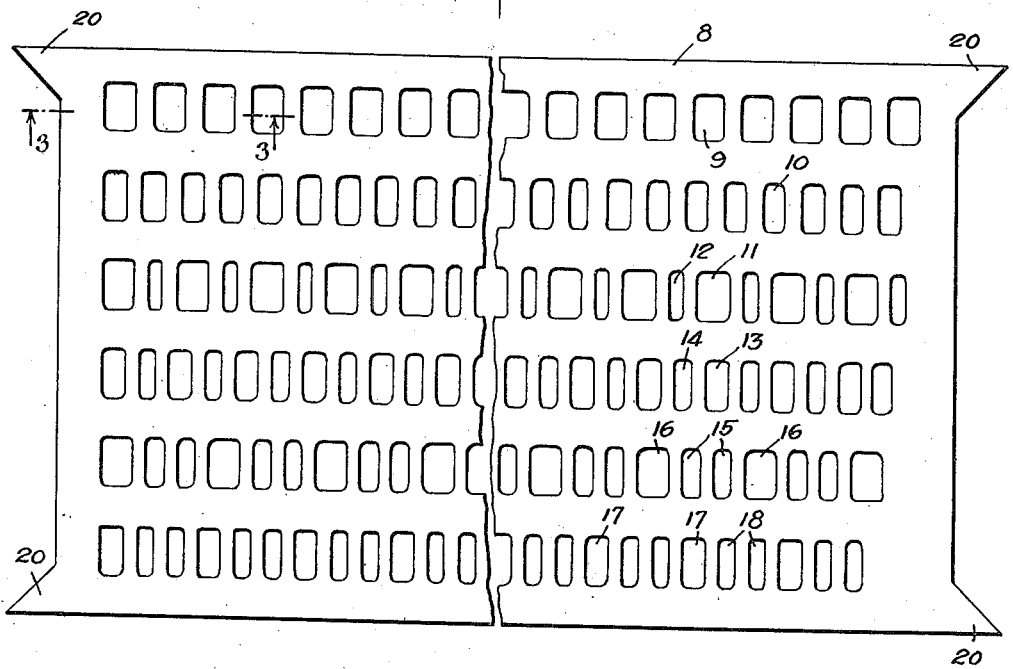
Fig. 2.
Fig. 3.
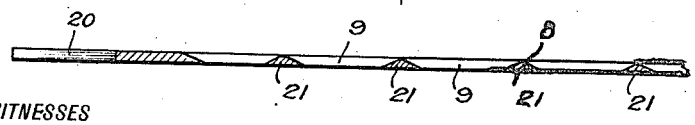
WITNESSES
Frederick Diehl.
E. S. Murdock
INVENTOR
V. Berkoff.
BY
ATTORNEYS

UNITED STATES PATENT OFFICE.

VLADIMIR BERKOFF, OF MOUNT VERNON, NEW YORK.

LINE-DOTTER.

1,293,313.  Specification of Letters Patent.  Patented Feb. 4, 1919.

Application filed May 8, 1918. Serial No. 233,303.

*To all whom it may concern:*

Be it known that I, VLADIMIR BERKOFF, a citizen of Russia, and a resident of Mount Vernon, in the county of Westchester and State of New York, have invented a new and Improved Line-Dotter, of which the following is a full, clear, and exact description.

Among the principal objects which the present invention has in view are: to provide a simple means for forming regular dotted or broken drawn lines; to provide an implement for assisting in the operation of drawing broken lines composed of marks of various lengths; to provide an implement of the character mentioned wherein provision is made for a variety of lines of standard characterization; and to provide an implement adapted to avoid blurring or blotting of the line executed through the assistance thereof.

Drawings.

Figure 1 is a perspective view showing in full and broken lines, the active and inactive positions, respectively, of a T-square and line dotter constructed and arranged in accordance with the present invention;

Fig. 2 is a side view on an enlarged scale, of a line dotter constructed and arranged in accordance with the present invention, the dotter being separated and contracted;

Fig. 3 is a detail view on an enlarged scale showing in section, a fragment of the line dotter, the section being taken as on the line 3—3 in Fig. 2.

Description.

As seen in the drawings, the improved line dotter is constructed from an elongated sheet of resilient material shaped to form the blade 8. The blade 8 is sufficiently wide to have formed therein a series of enlarged openings 9 and a series of relatively small openings 10, said openings and the intermediate spaces between the same being adapted to produce dotted lines when an inked marking tool is drawn thereover. Below the series of openings 9 and 10, is a series of enlarged openings 11 and intervening narrow openings 12. These openings when the marking tool is drawn thereover, form what is known as dot-and-dash lines, the dashes being of relatively long dimension. Below the series of openings 11 and 12, are other openings 13 and 14. The width of these openings more nearly corresponds to form a change of the dot-and-dash line which would be produced by using the series of openings 11 and 12. Two narrow openings 15 in the next line are arranged intermediate the wide openings 16. When a marking implement is drawn over the last-mentioned series, a dash-and-double-dot-line is formed, the dashes being of relatively enlarged dimension. In the lower line, the openings 17 correspond to the openings 16, with the exception that the openings 17 are narrower. The intermediate openings 18 in this line are relatively wider in correspondence with the openings 17, than are the openings 15 in correspondence with the openings 16 of the upper line.

It is obvious that when the blade 8 is disposed beneath the T-square 19, or other line-forming tool, and one or other of the series of openings is in line with the guiding edge, the marking implement is permitted to trace upon the underlying paper and is lifted therefrom between the marks with regularity corresponding to the series of openings over which it is traveling. It is equally obvious that the blade 8 is shifted to present the desired series of openings in operative position.

The blade 8 may be constructed of any suitable material, that generally used being a transparent celluloid. By reason of the transparency of the blade 8, the same may be disposed on a drawing so that the direction and terminals of the traced line may be clearly seen.

To avoid the possible smudging or blurring of the lines after the same have been made, and especially when made in ink, the blades 8 are constructed of a resilient material, such as the celluloid above referred to, which imparts to the said blade a normal curvature which the blade assumes when unrestrained, as seen by the broken lines in Fig. 1.

To prevent the ends of the blade 8 sweeping into and brushing over the inked line, I provide the pointed toes 20, upon which the blade raises itself automatically when the T-square 19 is lifted. It will be noted that the points of the toes 20 are at opposite sides of any possible line which could be constructed by aid of the blade 8.

As seen in Fig. 3 of the drawings, the intervening ridges 21 between the openings above mentioned, are inclined at opposite sides of a median ridge. The effect of this construction is to lift the point of a marking tool from and to permit the descent thereof to the paper upon which the line is being drawn. While it is preferred to have this form of intervening ridge, it will be understood that the invention is not limited thereto.

*Claim.*

An article of manufacture comprising a resilient normally bowed plate adapted to be pressed flat against a drawing surface, and having a plurality of series of openings disposed lengthwise therein and in parallel arrangement and also having tapered supporting members on its ends to lift the body of said plate above the drawing surface when bowed.

VLADIMIR BERKOFF.